United States Patent [19]

Hubbard

[11] Patent Number: 4,635,079

[45] Date of Patent: Jan. 6, 1987

[54] SINGLE ELEMENT TRANSDUCER FOR AN INK JET DEVICE

[75] Inventor: David W. Hubbard, Stamford, Conn.

[73] Assignee: Pitney Bowes Inc., Stamford, Conn.

[21] Appl. No.: 700,582

[22] Filed: Feb. 11, 1985

[51] Int. Cl.[4] .......... G01D 15/16

[52] U.S. Cl. .......... 346/140 R; 310/371

[58] Field of Search .......... 346/140; 310/371

[56] References Cited

U.S. PATENT DOCUMENTS

| | | | |
|---|---|---|---|
| 4,068,144 | 1/1978 | Toye | 346/140 X |
| 4,308,547 | 12/1981 | Lovelady | 346/140 R |
| 4,539,575 | 9/1985 | Nilsson | 346/140 |
| 4,588,998 | 5/1986 | Yamamuro | 346/140 R |

FOREIGN PATENT DOCUMENTS 0114574 3/1980 Japan .

*Primary Examiner*—Joseph W. Hartary
*Attorney, Agent, or Firm*—Peter Vrahotes; Melvin J. Scolnick; Albert W. Scribner

[57] ABSTRACT

The ink ejecting portion of an ink jet printer is described, wherein a single ceramic transducer is used to create the pressure for the ink droplets. Unlike prior devices, the transducer is a one-piece member as opposed to use of a crystal and diaphragm. The one-piece member is practical because of the generally spherical configuration of the crystal.

5 Claims, 4 Drawing Figures

SINGLE ELEMENT TRANSDUCER FOR AN INK JET DEVICE

BACKGROUND OF THE INVENTION

Printers and recorders of various types have been developed which employ a stream of ink droplets. The ink is expelled through a small opening as a result of the action of a transducer. A cavity is formed that is partially enclosed by flexible diaphragm backed by a piezo-electric material to form a chamber. The piezo-electric material has the ability to change shape upon being charged electrically. A channel leads from the chamber to the opening and another channel leads to the chamber so that ink may be supplied thereto. A small charge is applied to the piezo-electric material to alter its shape and thereby cause a drop of ink to be ejected from the chamber and out the opening. In prior devices, the transducer was composed not only of a piezo-electric material but also had a diaphragm layer between the chamber and the piezo-electric material. The diaphragm was made of a conductive material such as metal and was used to control the movement of the piezo-electric material.

Although prior systems have worked substantially well, improvements are always sought. One goal consistently pursued is to have the openings of the ink jet printer as close to one another as possible. Obviously, by having the openings close together, one is able to produce more dots per unit area and obtain more refined printing. The barrier in having openings close together is the fact that each chamber of the ink jet printer that requires a minimum amount of space. Various designs have been developed in order to have the openings close together. One attempt is to have more lines of openings whereby the openings are staggered relative to one another to form two rows of openings. Although this has the advantage of having more openings per line, the disadvantage is that synchronization is required between the enabling of the piezoelectric elements and movement of the medium being printed so that a price must be paid in electronics. Another way of attempting to increase the density of openings is to have elongated chambers as opposed to circular chambers. The problem with this configuration is that one loses efficiency. Another scheme attempted is to have not only longitudinally-shaped chambers, but to put them in a fanning arrangement. The disadvantage with this configuration is not only the inefficiency as a result of having elongated chambers but also the chambers are further removed from the openings.

SUMMARY OF THE INVENTION

A transducer for an ink jet printer has been conceived whereby the chamber portion of the ink supply occupies less space. Not only does the present invention provide the advantage of the chamber taking less space, but, in addition, the diaphragm normally associated with the transducer is no longer required. This is accomplished by using a ceramic piezo-electric element that has a domed-shaped configuration. It has been found that this particular configuration results in a transducer that does not require a diaphragm, as well as a transducer that provides a chamber of lesser space.

DETAILED DESCRIPTION OF THE PREFERRED EMBODIMENT

Figure 1:
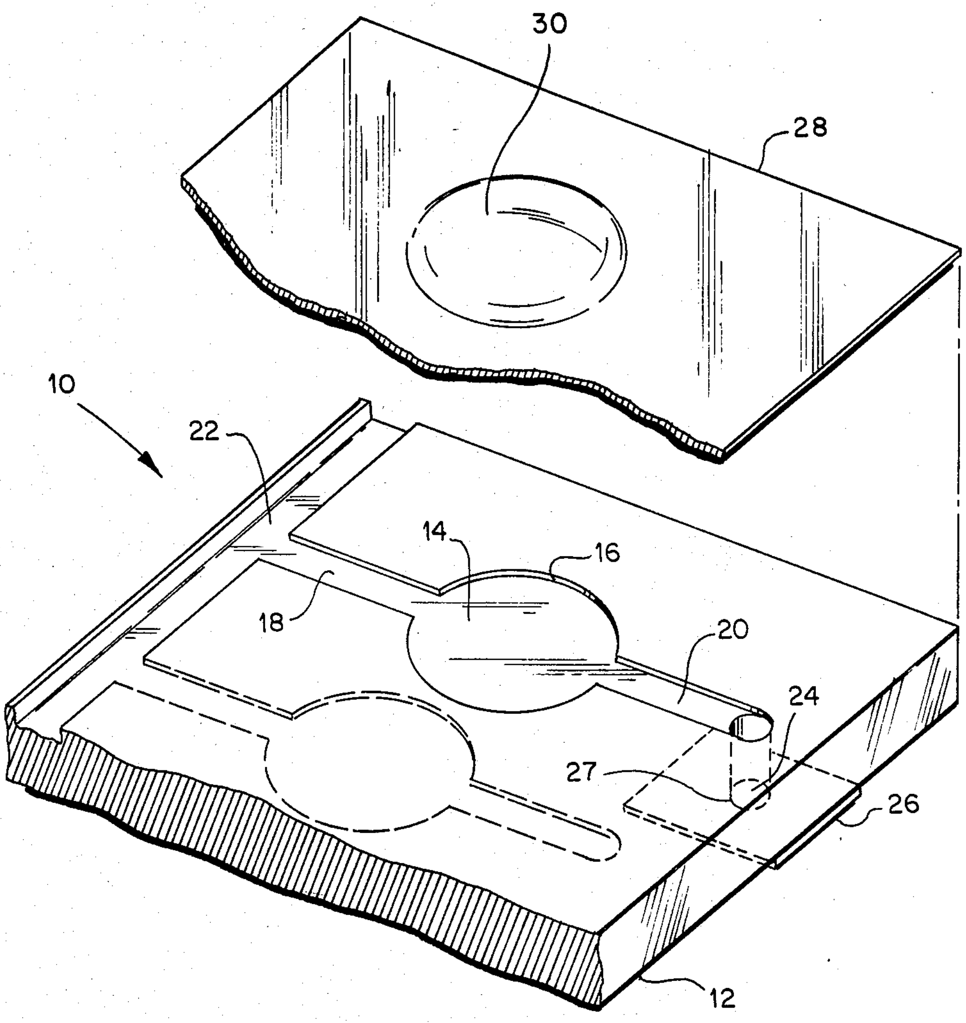
FIG. 1 is an isometric, expanded view of a portion of an ink jet printer fabricated in accordance with the instant invention.

Referring now to the drawing, one of the chamber portions of an ink jet printer is shown generally at 10 and includes a plate 12 having a cavity 14 therein. The cavity 14 has a wall 16 or indentation of approximately 0.150 inches and channels 18 and 20 extending therefrom in opposite directions. The first channel 18 is confluent with a groove 22, the groove being in communication with a central ink reservoir (not shown). In this way, in may be supplied to the cavity 14. The second channel 20 is confluent with an opening 24 that forms an orifice in the base 12. A plate 26 is located on the base 12 at the opening 24 and has a corresponding opening 27 therein to thereby form the orifice in the plate 12. Secured to the plate 12 is a quartz crystal 28 that preferably has a convex surface 30 therein. The convex surface 30 is of the same size as the cavity 14, thereby forming a domed-shaped chamber 32 in cooperation with the cavity 14. Although a convex surface 30 is preferable, other curvilinear surfaces may be used, including cylindical.

Only one chamber 32 is shown and described; however, it will be appreciated that a plurality of aligned chambers are located along the plate 12. The plate 12 is grounded and a positive voltage is supplied to the convex surface 30.

Figure 2:
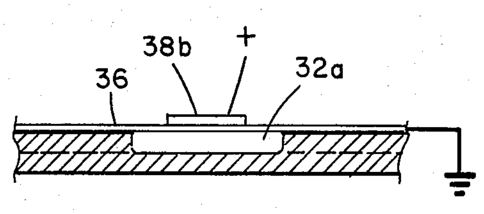
FIG. 2 (PRIOR ART)
FIG. 2 is a cross-sectional view of the ink chamber of a prior art ink jet printer.

Referring now to FIG. 2, a cross-sectional view of a prior art chamber **32*a* is shown. This includes a quartz portion 28*a* that is located over a diaphragm 36. The diaphragm 36 is generally made out of a metallic member. The quartz 28*a*** is connected to a positive voltage supply and the metallic member is grounded.

As is well known in the art, when a positive voltage is supplied to the quartz 28, it causes the chamber 32 to contract. This is the result of the quartz wanting to shorten, but it cannot, so it will contract into the chamber area 32. As the material goes into tension as a result of the positive voltage, it causes the ink to be ejected out of the channel 20 and through the orifice 27. Additional ink is supplied through the groove 22, the channel 18 and into the cavity 14. This is repeated a number of times and approximately 2,000 cycles per second may be achieved.

Figure 3:
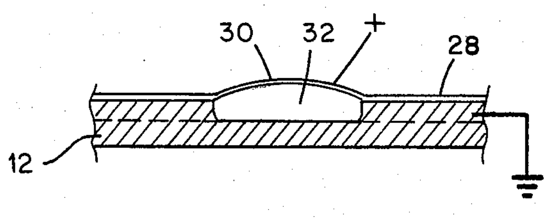
FIG. 3 is a cross-sectional view similar to that in FIG. 2 showing the configuration of the instant invention.

The advantage of the instant invention is two-fold. The first advantage is that a diaphragm is no longer required, thereby saving a considerable amount of time in manufacturing and expense. In addition to that, it has been found that a smaller cavity 14 is required. This leads to the advantage of requiring less space for the chamber 32 so that the openings 24 along the length of the plate 12 of the ink jet printer may be closer together without having to resort to the types of configurations that were used in prior art systems. As a consequence, when a sheet is conveyed in front of the plate, the density of the dots that may be printed on the sheet will be increased with a resulting improvement in printing quality. As shown in FIG. 3, the convex surface is directed away from the cavity 32, but it has been found that the invention works even though the convex surface is inverted so that it is directed into the cavity. Obviously, the disadvantage of this resides in the reduction of the volume of the cavity 32.

Figure 4:
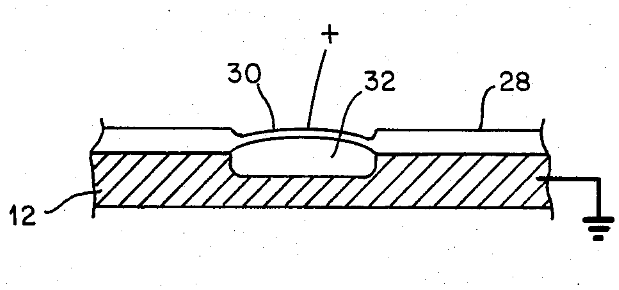
FIG. 4 is a cross-sectioned view similar to FIG. 3 only showing another embodiment of the instant invention.

In the matter of fabrication of the piezo-ceramic crystal 28 it may be advantageous to mold, cast, or machine the curved portion 32 from a thicker plate as shown in FIG. 4. This will permit a storage part that is less liable to be damaged during fabrication. In addition, multiple adjacent transducers can be formed from a single piece of ceramic material. In this case, the front electrode, (which also serves to form an impermeable liquid barrier for the ink) is common to all transducer cavities. The electrodes on the convex or outer surface, is selectively deposited so that each transducer can be pulsed independently.

What is claimed is:

1. Ink ejecting portion of an ink jet printer, comprising:

a plate;
a cavity in said plate;
a first channel in said plate extending from said cavity;
a recess confluent with said first channel;
a second channel in said plate extending from said cavity;
an opening in said plate confluent with said second channel;
a crystal disposed upon said plate and extending over said cavity to form a chamber therewith, said crystal having a free standing convex configuration at the location of said cavity; and
means for applying a voltage to said crystal; whereby, upon a voltage being applied to said crystal said convex portion of said crystal will shorten and contract into said chamber.

2. The device of claim 1 wherein said convex portion of said crystal has a narrower thickness than the balance of said crystal.

3. An ink ejecting portion of an ink jet printer, comprising:

a plate;
a cavity in said plate;
a first channel in said plate extending from said cavity;
a recess confluent with said first channel;
a second channel in said plate extending from said cavity;
an opening in said plate confluent with said second channel; and
a crystal disposed upon said plate and extending over said cavity to from a chamber therewith, said crystal having a free standing curvilinear configuration at the location of said cavity;
means for supplying a voltage to said crystal; and
means for grounding said plate; whereby,
upon a voltage being to said crystal said curvilinear portion of said crystal will shorten and contract into said chamber.

4. The device of claim 3 wherein said curvilinear configuration is convex.

5. The device of claim 4 wherein said convex configuration is directed away from said recess.

* * * * *